United States Patent [19]
Bridges

[11] 3,991,853
[45] Nov. 16, 1976

[54] TREE PLATFORM

[76] Inventor: Bobby L. Bridges, 924 Oconee St., Athens, Ga. 30601

[22] Filed: Mar. 15, 1973

[21] Appl. No.: 341,364

[52] U.S. Cl. ............................................... 182/187
[51] Int. Cl.² ................................................ A47C 9/10
[58] Field of Search .................... 182/187, 133, 136

[56] References Cited
UNITED STATES PATENTS

| | | | |
|---|---|---|---|
| 3,116,808 | 1/1964 | Riley | 182/187 |
| 3,338,332 | 8/1967 | Brantly | 182/187 |
| 3,352,379 | 11/1967 | Riggs | 182/187 |
| 3,460,649 | 8/1969 | Baker | 182/187 |
| 3,485,320 | 12/1969 | Jones | 182/136 |
| 3,504,767 | 4/1970 | Sherman | 182/136 |

*Primary Examiner*—Reinaldo P. Machado
*Attorney, Agent, or Firm*—Newton, Hopkins & Ormsby

[57] ABSTRACT

A device for aiding a user in climbing a tree to a vantage point where the device serves as a supporting platform includes a lightweight platform which attaches to the user's feet and is provided with spurs for penetrating into the tree trunk. Stabilizing frameworks project upwardly and rearwardly from the opposite sides of the platform to straddle the tree trunk and two separate devices are provided to attach between these frameworks to pass behind and engage the trunk. One is a rigid bar used normally during climbing and the other is a flexible metal strap below the bar. When a limb is reached by the bar the strap is fixed in place while the bar is swung aside thus allowing the assembly to be elevated so that the bar can then be reattached above the limb so that detachment of the strap allows the user to climb further.

2 Claims, 6 Drawing Figures

TREE PLATFORM

BACKGROUND OF THE INVENTION

Devices which attach to a person's feet for allowing a user to climb a tree and then use the device as a seat or as a platform on which to stand are known, as evidenced by the Baker et al U.S. Pat. No. 3,460,649 of Aug. 12, 1969. Such devices suffer from a serious handicap, however, in that they are incapable of being used to climb past a tree limb and thus seriously restrict the user's choice of a vantage point.

BRIEF SUMMARY OF THE INVENTION

The present invention is directed to a device as described above wherein the capability for climbing past tree limbs is present. Briefly stated, this capability stems from the provision of a pair of selectively operable tree-engaging members, one of which is normally employed both in climbing and while the assembly functions as a support and the other of which is used temporarily to supplant the first when a tree limb is encountered and until such first member clears such limb and is again able to function in its normal manner.

Specifically, the first member is in the form of a V-shaped bar and the other member is in the form of a flexible metal strap disposed below the bar. The platform itself is provided with spurs or spikes which dig into the tree and the aforesaid members merely engage or react against the opposite side of the tree at a level above the platform. When the bar encounters or approaches a tree limb, the strap is fixed in place to function in lieu of the bar and the bar is swung aside whereafter the device is hitched up by the user so that the bar passes above and clears the limb, whereafter the bar is reattached, the strap is disengaged and climbing resumed in normal fashion.

BRIEF DESCRIPTION OF THE DRAWING FIGURES

FIGS. 1–5 are perspective views showing sequential operations in usage of the device; and FIG. 6 is a perspective view showing various details of the assembly.

DETAILED DESCRIPTION OF THE INVENTION

Figure 1:
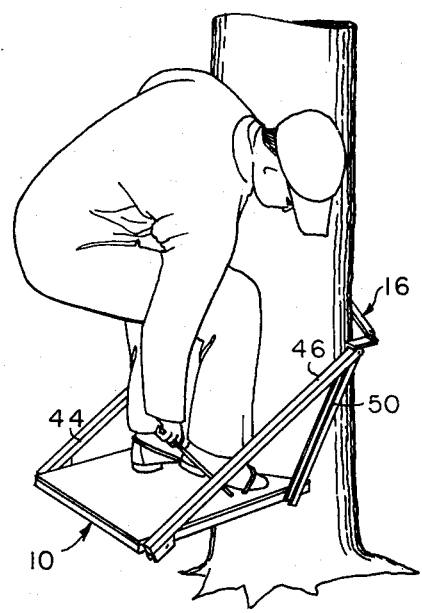

Referring at this time more particularly to FIG. 6, the tree climbing and support assembly according to an illustrative embodiment of this invention includes the platform device indicated generally by the reference character 10 having stabilizing frameworks 12 and 14 secured to opposite sides thereof so as to straddle a tree trunk as hereinafter described, there being a first reaction means 16 associated with the frameworks 12 and 14 which is utilized normally in the climbing and supporting operations, and a second reaction means indicated generally by the reference character 18 which is used under the circumstances hereinafter described in lieu of the reaction means 16.

Figure 5:
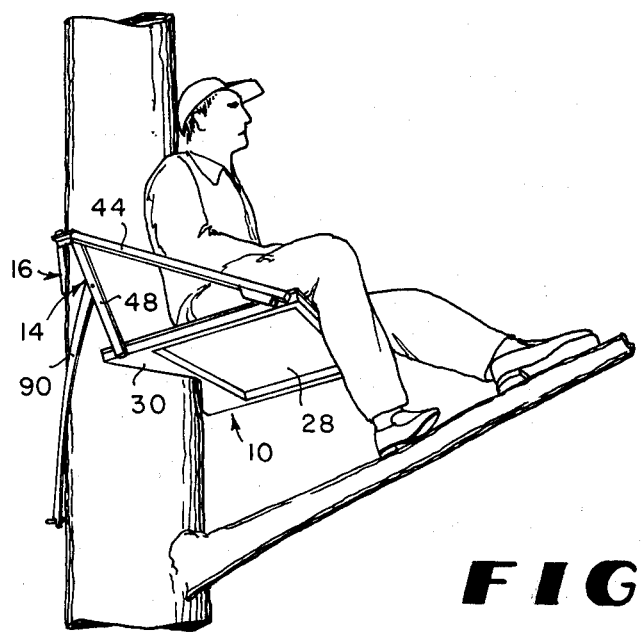
Figure 6:
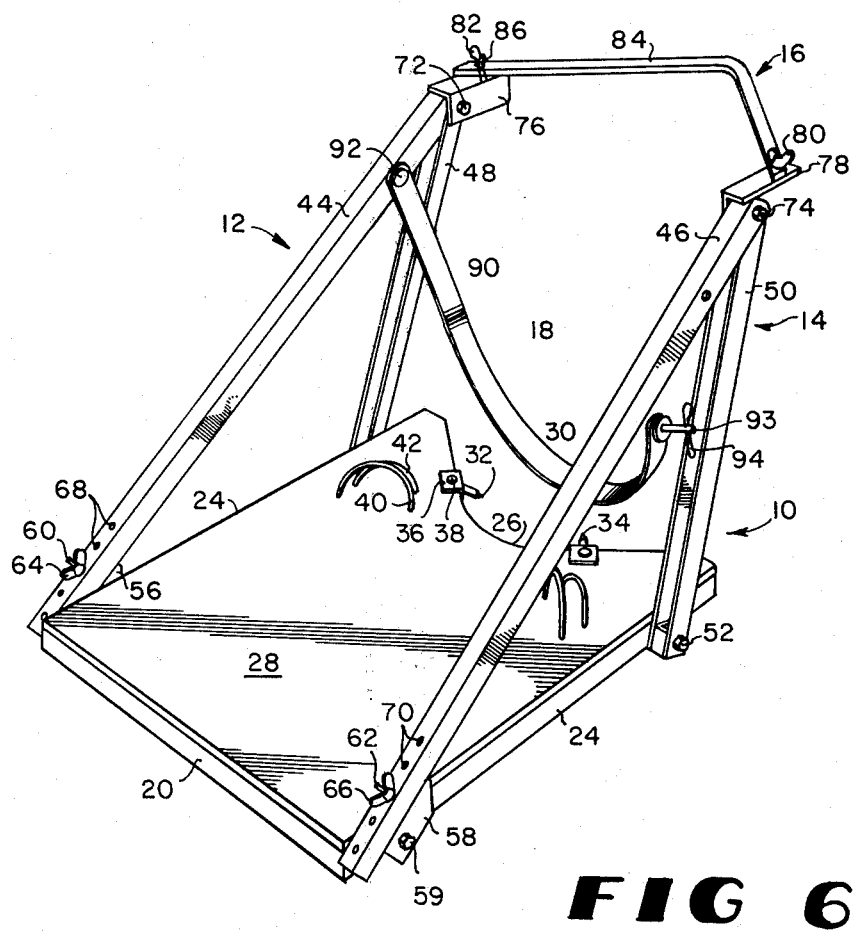

The platform 10, as can be seen in FIGS. 5 and 6, incorporates a generally rectangular frame consisting of the front frame member 20, the opposite side frame members 22 and 24 and the rear frame member 26 to which a seat or platform 28 peripherally is attached by any suitable means such as fasteners, gluing or the like. The various frame members 20, 22, 24 and 26 preferably are of hollow construction and are fabricated from high quality aircraft aluminum so as to be lightweight and the platform 28 proper may be constructed of plywood, synthetic resinous material or the like which possesses good rigidity and yet is of lightweight construction.

The rear edge of the platform assembly is notched or of generally V-shaped configuration as indicated by the reference character 30 and is provided thereon with a pair of downwardly and rearwardly projecting spurs 32 and 34 so as to penetrate and dig into the tree trunk, each spur being rigidly affixed to a U-shaped bracket such as that indicated by the reference character 36 which embraces the rear edge of the platform assembly and is rigidly affixed thereto as by fastener 38. Anchoring means for the user's feet are provided each preferably of a pair of loops 40 and 42 of bungee cord passing through suitable openings in the platform 28, substantially as is shown so that the user may slip the toe of his shoe under the smaller of the loops 40 and then stretch the larger of the loops 42 behind his shoe in the manner which is indicated in FIG. 1. In this fashion, the platform assembly is essentially anchored to the user's feet for a purpose which will be presently apparent.

The frameworks 12 and 14 each include an upwardly and rearwardly inclined strut 44 or 46 and a generally upright strut 48 or 50. These struts preferably are fabricated of channel section from high quality aircraft aluminum and the lower ends of the struts 48 and 50 are pivotally attached to the respective side frame members 22 and 24 as by means of the pivot bolts 52 as shown. Preferably, a filler or block 54 is disposed between the legs of the struts 48 and 50 and through which the pivot bolts 52 pass to prevent deformation or crushing of the struts in this region. The lower end of each strut 44 or 46 is secured to a support bracket 56 or 58 each of which is pivotally attached to its respective side frame member 22 or 24 as by means of a pivot bolt 59 as shown in the right-hand side of FIG. 5. Again, the brackets 56 and 58 may be of channel configuration provided with filler blocks to prevent crushing by the pivot bolt 58 and the web of each such channel section is provided with an upstanding stud 60 or 62 rigidly affixed thereto and which is threaded to receive the respective wing nuts 64 and 66. These studs are adapted to be received in a selected one of a plurality of openings 68 or 70 in the webs of the struts 44 and 46, substantially as is shown so as to accommodate the device for larger or smaller diameter tree trunks, as will be evident hereinafter.

The upper end of the two sets of struts 44, 48 and 46, 50 are joined by the pivot bolts 72 and 74 which join their respective struts and also serve to secure the anchor brackets 76 and 78 thereto. These anchor brackets preferably are in the form of angle members again provided with vertically projecting studs, one of which receives a wing nut 80 and the other of which receives a wire spring clip device 82 through a diametrically extending bore adjacent the upper end of the stud.

The two anchor members 76 and 78 in this way secure the opposite ends of the V-shaped bar 84 to the upper ends of the frameworks 12 and 14, the clip device 82 permitting ready and easy removal thereof from its associated stud 86 to allow the bar 84 to be lifted at the corresponding end to clear the stud 86 and allow the bar to be swung aside about the axis of the stud 88 as will hereinafter be described in greater detail.

The second reaction means 18 is in the form of a flexible strap of metal 90 pivotally secured at one end by a suitable fastener 92 to the strut 44 at a location below the bar 84 and the opposite end of this strap is provided with a pin 93 provided with a diametrical bore for receiving the wire clip device 94 similar to that described in conjunction with the reference character 82. The pin 93 is selectively projectible through apertures in the strut 46 one of which is indicated by the reference character 96 and the clip 94 is utilized to anchor the pin in place, as will be evident.

Referring now to FIGS. 1–5, it will be evident that the device is first erected at the base of the tree as indicated in FIG. 1 after swinging the bar 84 behind the tree, as shown, and securing it to the stud 86 and effecting the locking action by the clip 82. Thereafter the user can stand on the platform as shown and affix same to his feet through the anchor means previously described, the anchoring operation being depicted in FIG. 1.

Figure 2:
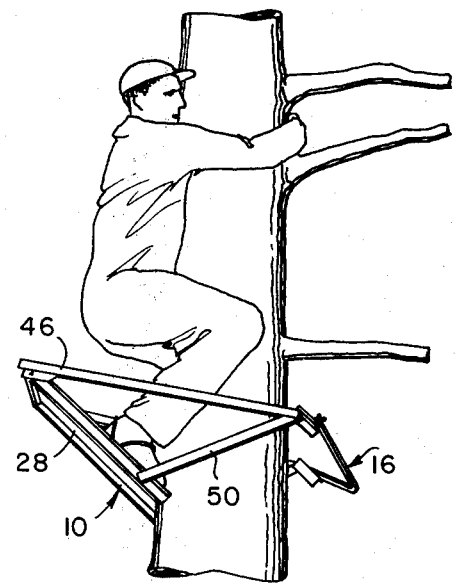
Figure 3:
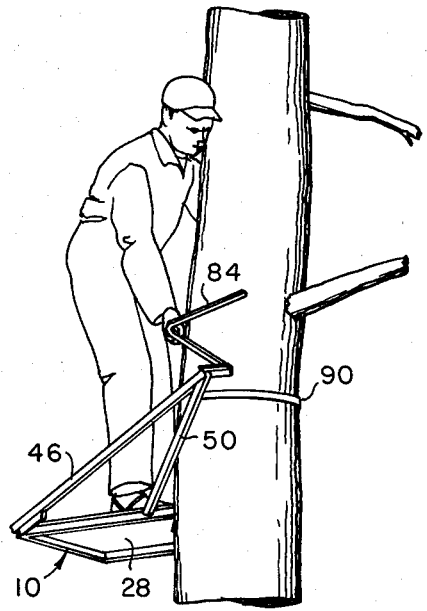
Figure 4:
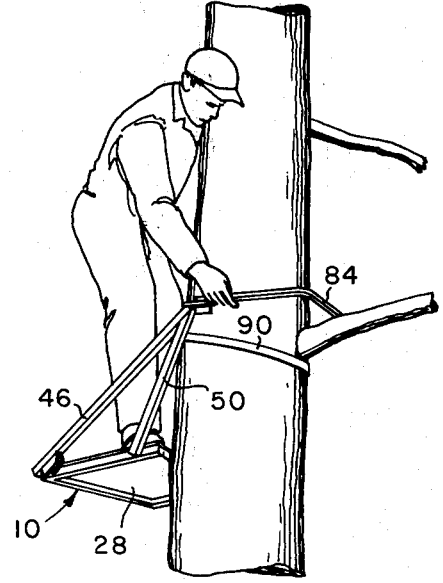

The user then has the device attached to his feet and by hugging the tree and hitching his legs up in the fashion indicated in FIG. 2, he can quickly and easily climb up the tree in a series of hitching steps. During this operation, the spurs 32 and 34 operate effectively to anchor the device to the tree and prevent the device from "cutting out" which might cause possible injury to the user. When the user encounters a tree limb such as the limb L depicted in FIG. 2, he hitches the device up so that the bar 84 ends up in a position very close to the area immediately beneath the limb L whereafter he connects the strap 90 in place in lieu of the bar 84, disengages the clip 82 and that end of the bar 84 from the framework 12 and swings the bar 84 aside in the manner and fashion indicated in FIG. 3. Thereafter, he hitches himself up further as is indicated in FIG. 4 so that the strap 90 now is close to the underside of the limb L such that the bar 84 may now be swung back to clear over the limb L and reattached whereafter the strap 90 is detached and climbing proceeds in the normal fashion as described above. When the user reaches the desired vantage point, he merely detaches his feet from the anchor means 40, 42 and uses the platform either to stand upon or to act as a seat as is indicated in FIG. 5, it being a particular convenience that a limb can be utilized as a footrest as shown.

It will be noted that the flexibility and pivotal connection of the strap 90 easily allows rather large limbs to be passed as will be evident from FIG. 4 since the flexibility and pivotal relation of the strap 90 allows the platform device to be elevated quite a distance above the limb as is indicated by the inclined relation of the strut 90 in FIG. 4.

In use, the anchor members 76 and 78 are attached through their pivot bolts 72 and 74 so that a frictional drag is produced but wherein the anchor members nevertheless can pivot about the bolts 72 and 74. This relieves the framework assemblies 12 and 14 from undue strain which would be the case where the bar 84 would be rigidly attached to these members. Likewise, the pivot bolts 52 are tightened only to the extent of providing a drag on the struts 12 and 14 and, likewise, the bracket members 56 and 58 are adjusted through their pivot bolts 58 to have a slight frictional drag also. In this manner, each of the frameworks 12 and 14 is so interconnected that adjustments through the studs 60, 62 and the wing nuts associated therewith such that the frameworks can easily be adjusted to accommodate for the requisite size of the tree whereby the platform assembly will be essentially horizontal when in use.

What is claimed is:

1. A tree climbing and support platform device comprising, in combination:

a platform member having a generally veed rear edge adapted to rest against one side of a tree trunk;

a pair of stabilizing framework secured to opposite side of said platform and extending upwardly and rearwardly thereof to straddle the tree trunk, each stabilizing framework comprising a first strut pivotally secured at its lower end to said platform member adjacent the forward edge thereof and inclining upwardly and rearwardly therefrom, and a second strut pivotally secured at its opposite ends to said platform member adjacent the rear edge thereof and to said first strut adjacent the upper end thereof;

a first reaction means for selective securement at its opposite ends adjacent the upper ends of said stabilizing framework to engage the tree trunk above said platform member on that side opposite to said one side against which said platform member rests;

foot-anchoring means on said platform member for anchoring a user's feet thereto whereby to allow such user to climb the tree with the aid of said platform device;

auxiliary reaction means for selective connection between said frameworks to engage against the tree trunk in spaced relation to said first reaction means whereby to allow the user to climb past a limb projecting from the tree trunk, said first reaction means comprising a generally V-shaped bar and said auxiliary reaction means comprising a length of flexible material, said flexible material being positioned below said V-shaped bar; and said device further including a pair of anchor members pivotally secured about horizontal axes respectively to the upper ends of said first struts, said first reaction means being selectively secured to said anchor members.

2. A tree climbing and support platform device as defined in claim 1 including a pair of spurs secured to said rear edge of the platform member and extending rearwardly and downwardly therefrom.

* * * * *